US012634290B2

(12) United States Patent
Wood et al.

(10) Patent No.: US 12,634,290 B2
(45) Date of Patent: May 19, 2026

(54) SHARING CUSTOMER DATA BETWEEN ENTITIES IN AN ORGANIZATION

(71) Applicant: Stripe, LLC, South San Francisco, CA (US)

(72) Inventors: Daniel Wood, Seattle, WA (US); Debanshu Singh, San Jose, CA (US); Patrick Shields, Durham, NC (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/747,406

(22) Filed: Jun. 18, 2024

(65) Prior Publication Data

US 2025/0385920 A1　Dec. 18, 2025

(51) Int. Cl.
　　*G06F 21/00*　　　(2013.01)
　　*H04L 9/40*　　　(2022.01)

(52) U.S. Cl.
　　CPC .......... *H04L 63/104* (2013.01); *H04L 63/105* (2013.01)

(58) Field of Classification Search
　　CPC ............................ H04L 63/104; H04L 63/105
　　See application file for complete search history.

(56) References Cited

U.S. PATENT DOCUMENTS

| | | | | | |
|---|---|---|---|---|---|
| 7,630,986 B1 * | 12/2009 | Herz | .................. | G06Q 30/0603 |
| | | | | | 707/999.009 |
| 8,448,220 B2 * | 5/2013 | Roy | ...................... | G06F 21/604 |
| | | | | | 726/1 |
| 8,943,575 B2 * | 1/2015 | Kumar | ................ | H04L 63/0227 |
| | | | | | 726/13 |
| 10,027,554 B2 * | 7/2018 | Mishra | .................. | H04L 41/147 |
| 2004/0002932 A1 * | 1/2004 | Horvitz | ................ | G06Q 10/107 |
| | | | | | 706/46 |
| 2004/0193703 A1 * | 9/2004 | Loewy | ................ | H04L 41/0894 |
| | | | | | 709/220 |
| 2008/0209505 A1 * | 8/2008 | Ghai | ........................ | G06F 21/55 |
| | | | | | 726/1 |
| 2009/0320093 A1 * | 12/2009 | Glazier | ..................... | G06F 8/10 |
| | | | | | 726/1 |
| 2010/0037289 A1 * | 2/2010 | Roy | ........................ | G06F 21/604 |
| | | | | | 726/1 |
| 2015/0135300 A1 * | 5/2015 | Ford | ........................ | G06Q 50/18 |
| | | | | | 726/11 |
| 2017/0243195 A1 * | 8/2017 | Xing | .................. | G06Q 20/0855 |
| 2020/0106780 A1 * | 4/2020 | Malliah | .................. | G06F 16/437 |
| 2021/0211470 A1 * | 7/2021 | Wood | ...................... | H04L 63/08 |
| 2023/0027329 A1 * | 1/2023 | Durham | .................. | G06F 21/54 |
| 2024/0378305 A1 * | 11/2024 | Acharya | ............. | G06F 21/6227 |

* cited by examiner

*Primary Examiner* — Kendall Dolly
(74) *Attorney, Agent, or Firm* — BAKERHOSTETLER

(57) ABSTRACT

A server can adjust access privileges of a customer object of a first entity to provide access to the customer object to a second entity that is associated with the first entity in an organizational data structure, resulting in a shared customer object. An operation request can be received which is associated with the second entity with regard to the shared customer object. An option to associate at least one account object of the first entity to the shared customer object may be provided. After receiving an indication to associate the at least one account object to the shared customer object, the operation request may be executed using the at least one account object.

20 Claims, 9 Drawing Sheets

Data Flow 300

500

Receive, at a server, a request to add a second entity to an organization data structure, wherein the organization data structure includes an association with a first entity comprising first resources and second resources    502

Send, by the server to a device associated with the second entity, a request to associate the second entity with the organization data structure    504

Receive, by the server, a response from the device associated with the second entity indicating to associate the second entity with the organization data structure    506

Associate, by the server, the second entity with the organization data structure by: providing, from the server to the device associated with the second entity, an organization identifier to be stored in association with the second entity, and storing, by the server, a second entity identifier associated with the second entity, wherein upon associating the second entity with the organization data structure, the second entity gains access to the first resources and not the second resources    508

*FIG. 5*

800

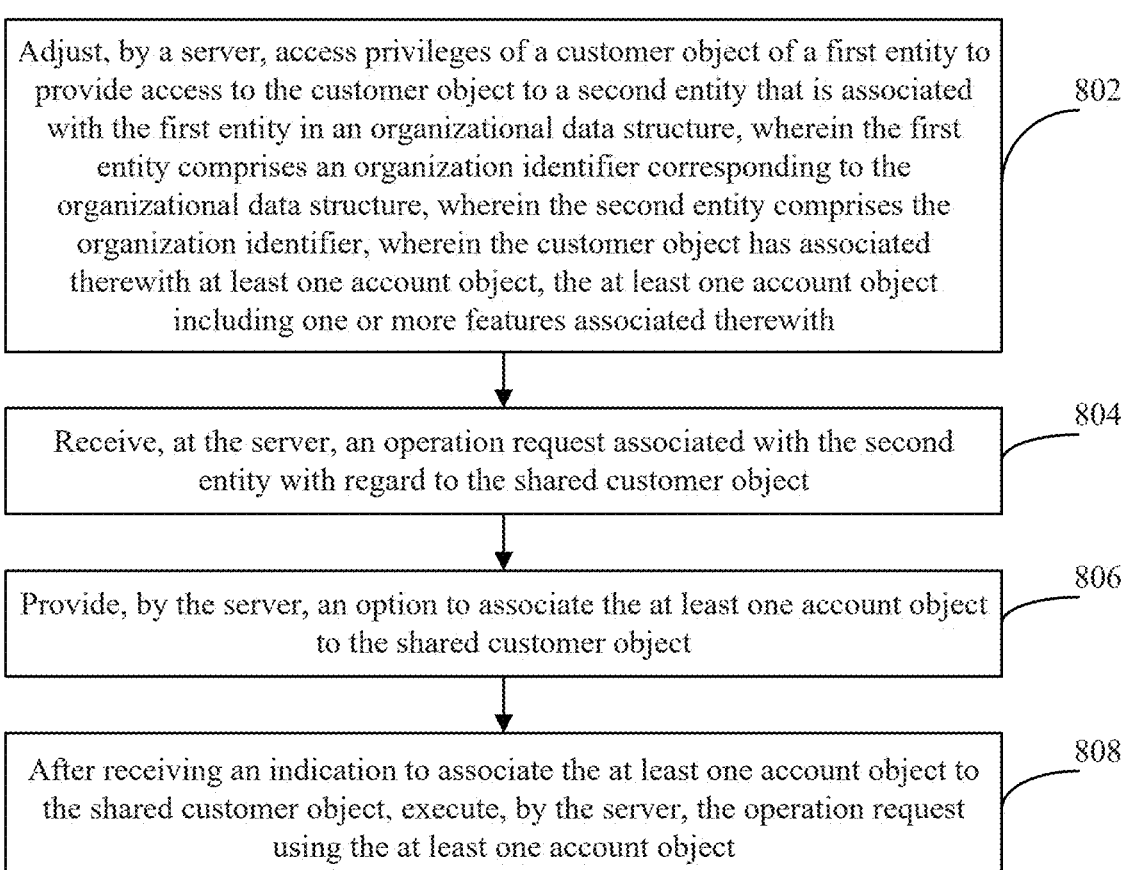

Adjust, by a server, access privileges of a customer object of a first entity to provide access to the customer object to a second entity that is associated with the first entity in an organizational data structure, wherein the first entity comprises an organization identifier corresponding to the organizational data structure, wherein the second entity comprises the organization identifier, wherein the customer object has associated therewith at least one account object, the at least one account object including one or more features associated therewith                802

Receive, at the server, an operation request associated with the second entity with regard to the shared customer object                804

Provide, by the server, an option to associate the at least one account object to the shared customer object                806

After receiving an indication to associate the at least one account object to the shared customer object, execute, by the server, the operation request using the at least one account object                808

*FIG. 8*

SHARING CUSTOMER DATA BETWEEN ENTITIES IN AN ORGANIZATION

The present description generally relates to establishing two related entities as being part of a same organization for management purposes and, as a result, sharing customers and modalities related to the customers between at least two entities in the organization.

BACKGROUND

A group of business entities may be owned by a larger business entity but may be operated independently. Independent operation of the business entities typically makes resource sharing between business entities difficult to achieve.

BRIEF DESCRIPTION OF THE DRAWINGS

Certain features of the subject technology are set forth in the appended claims. However, for the purpose of explanation, several embodiments of the subject technology are set forth in the following figures.

FIG. 5 depicts a flow diagram of an example process for associating an entity with an organizational data structure, in accordance with one or more embodiments.

FIG. 8 depicts a flow diagram of an example process for sharing a customer object with an entity associated by an organizational data structure, in accordance with one or more embodiments.

DETAILED DESCRIPTION

Figure 1:
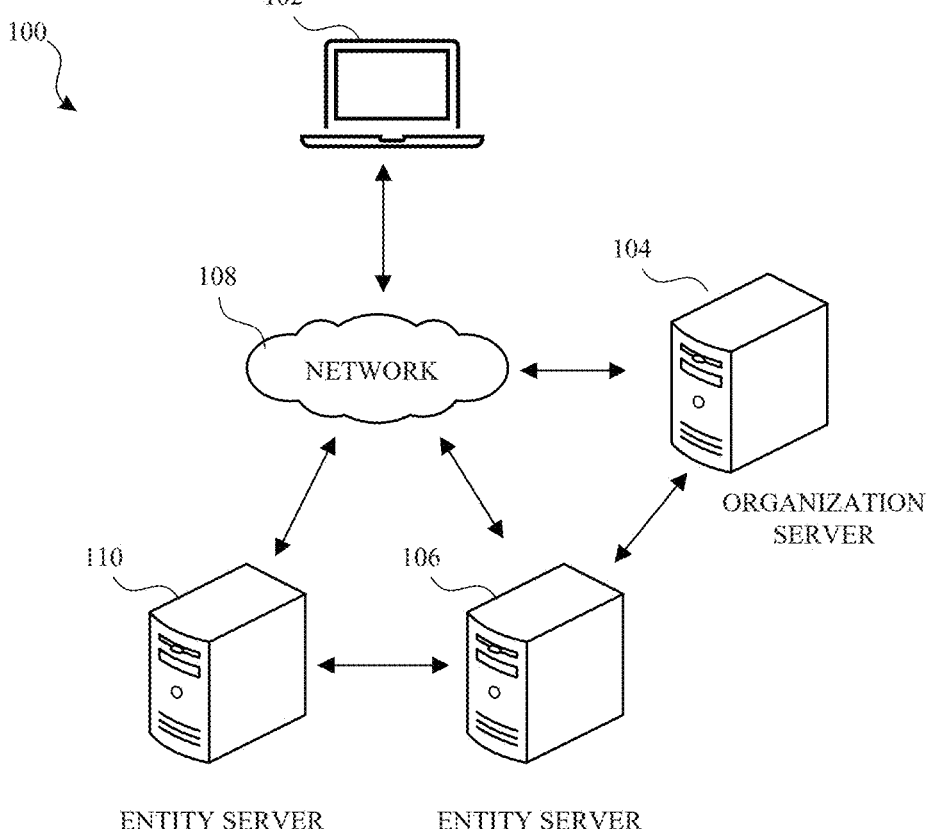
FIG. 1 illustrates an example network environment in which the subject technology may be implemented, in accordance with one or more embodiments.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other embodiments. In one or more embodiments, structures and components are shown in block diagram form in order to avoid obscuring the concepts of the subject technology.

Technically savvy business entities may each provide many tools for their owners, managers, and customers to interact with the business entity and manage aspects of the business entity. A customer may manage their own data within a business entity context and a manager or authorized user may manage business data within the business entity context. Some entities may be owned by another larger entity. For example, a restaurant group owner may own several independent restaurant brands. These brands could have been started by the restaurant group and have a unified technological infrastructure that is used for each brand entity. Or these brands could have been acquired by the restaurant group and have a unique technological infrastructure. In either case, however, it may be advantageous for each entity of a larger organization to be able to integrate their data systems. This may be easier said than done. For example, when each entity operates independently of the other entities, even with an entity built on a unified technological platform as another business entity, the specific implementations can quickly diverge since there is not necessarily organizational oversight to enforce strict policies. And in any case, the rules and regulations governing some entities versus other entities may be different and sometimes mutually exclusive such that it would be practically impossible to maintain.

Aspects of the subject technology provide a way of integrating separate entities into an organization to perform resource sharing and management sharing which can help streamline certain aspects of the entities as well as enhance customer experience working with the businesses. These aspects would allow a way for one entity, for example, a US hotel chain, to share resources, such as customer data, to another entity, for example, a French registered counterpart to the US hotel chain. Thus, when a customer travels to France, for example, information associated with the customer at the US hotel chain can be provided to the French counterpart without the user reentering all their information while satisfying privacy and regulatory concerns.

Aspects of the subject technology provide organization level tools and management services so that data across many entities of the organization can be centrally aggregated. It is contemplated for example, that the data may include transaction data related to payments from customers to vendors. Reports can include entity level breakdowns for the entire organization. This also makes organization level fraud detection easier to implement. Various entities can further be grouped into sub-organizations in the organization and certain permissions granted across the sub-organizations.

Aspects of the subject technology provide a way for already existing entities within a certain context, such as a context that each is a customer of a software as a service (SaaS) provider or a customer of a payment processor, to be interrelated as being part of a larger organization data structure. For example, a first entity can establish an organization data structure and join themselves to the organization data structure. Then the first entity can initiate an onboarding option to bring in another related entity as a second entity of the organization data structure. Because each of the entities are already within the same context, the entities can be interrelated and integrated in an organization data structure for that context.

Aspects of the subject technology also provide a way for resources of an entity in association with an organization data structure to be shared with other members of the organization data structure. As mentioned in previous examples, customer data corresponding to a customer of a first entity can be shared with a second entity. The customer data can be stored in a customer object with generalized data fields and specialized data fields specific to the entity. The sharing may provide the generalized data fields to another entity while withholding the specific fields for the customer object. Then the other entity can incorporate the customer object as a link back to the customer object under control of the first entity and add their own specific customer fields as needed. Then, when the generalized data fields of the customer information are updated at the first entity, the updates may be automatically reflected at the other entity.

Aspects of the subject technology also provide the ability to share customer modalities associated with the customer object to other entities, as needed, and as permitted by the customer. As used herein a modality can include any kind of method of payment or a payment-related instrument or program. For example, a modality can include a banking object, such as a checking account, savings account, line of credit, bank issued credit card, debit card, or another type of credit card or payment instrument, such as credit cards, debit cards, health savings account cards, or flexible spending account cards; a brokerage object, such as a stock and bond portfolio, unencumbered funds, and/or margin; a payment authorization object, such as a recurring authorized charge or an unsettled transaction; a coupon object, such as, a user discount, subscription-based discount, an employee discount, or coupon code; a rewards object, such as a store points system or a mileage rewards system; a credit object such as a store credit, return credit, or store provided cashback reward; a debit object, such as a store-related debit account, an obligation to pay, a room charge; a gift card object; and the like. For example, the customer may purchase an item through the first entity and in doing so establish a modality with the first entity including a payment instrument, such as bank card or checking account ACH. If so permitted by privacy and authorization settings for each modality, when the customer attempts to purchase a service at the other entity, the other entity can provide an option for the customer to use one or more of the previously established modalities at the other entity, based on whether the modality was permitted to be shared.

Aspects of the subject technology provide technological advantages. Through the association of a first entity to a second entity by means of a mutual association with an organization data structure, first entity computer systems can gain access to resources of the second entity, and vise versa, reducing time, energy, and overall networking resources needed to maintain the same resources independently of the other entity. Further, sharing entity data with an organization server provides the ability to leverage, maintain and generate many functions of an entity within a larger context of the organization server. Such functions include, for example, the processing and aggregation of reporting and the processing and review of transactions. Further still, resource sharing between entities is made possible by relationally tying entities to each other through the organization data structure. For example, a customer object in a first entity can be shared with permission by the customer to a second entity, thereby saving time and resources for the customer and the entities. In another example, a modality associated with the customer, such as described above, such as a banking object, payment object, coupon object, discount object, rewards object, credit object, debit object, and the like can be selectively shared and associated with the customer object as linked in another entity, thereby saving a customer and the associated first or second entity time and resources.

FIG. 1 illustrates an example network environment 100 in which the subject technology may be implemented, in accordance with one or more embodiments. Not all of the depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, an organization server 104, and one or more entity servers such as entity server 106, and entity server 110. The network 108 may communicatively (directly or indirectly) couple one or more of the electronic devices 102, the organization server 104, the entity server 106, and the entity server 110. In one or more embodiments, the network 108 may be an interconnected network of devices that may include, or may be communicatively coupled to, the internet.

For explanatory purposes, the network environment 100 is illustrated in FIG. 1 as including the electronic device 102, the organization server 104, the entity server 106, and the entity server 110; however, the network environment 100 may include any number of electronic devices and/or any number of servers communicatively coupled to each other directly or via the network 108. In addition, the various systems of FIG. 1 may be, and/or may include all or part of, the electronic system discussed below with respect to FIG. 9.

The electronic device 102 may be under the control of a user with authorization to access and/or update records associated with the organization server 104 and/or one or more of the entity server 106 and the entity server 110. The electronic device 102 while operating as specified herein may have authorization to interact with the organization server 104, the entity server 106, and/or the entity server 110, for example, such as through an account login or other access credential. Thus, the electronic device 102 is used to access one or more management applications which access entity information and/or organization data structure information. The electronic device 102 may be, for example, a wearable device (such as a watch, a band, and the like), a desktop computer, a portable computing device (e.g., a laptop computer), a point of service terminal, a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a laptop computer. The electronic device 102 may be associated with one or more accounts, credentials, or any other identity information registered with the organization server 104, entity server 106, and/or entity server 110, in accordance with some implementations.

The organization server 104 may be and/or may include, for example, one or more servers that host or facilitate an application that utilizes various data structures and/or databases to provide services and management related to an organization of various entities, such as an organization data structure which contains information therein regarding multiple entities of the organization, such as entity identifiers, entity resource information, entity transaction information, entity search information, and so forth. As an example, the organization server 104 may include an onboarding module to provide entity onboarding into the organization data structure. As another example, the organization server 104 may facilitate resource sharing among the entities of the organization data structure and store associated information. In some embodiments, the organization server 104 may be implemented as service of one or more servers. Such one or more servers or the organization server 104 may be, and/or may include all or part of, the electronic system discussed below with respect to FIG. 9.

The entity servers 106 and 110 may each be and/or may include, for example, one or more servers that host or facilitate a service that may be used by one or more entities. The entity servers 106 and 110 may provide server applications for authorized users associated with the entity to access entity related data. In some embodiments, the entity servers 106 and/or 110 may be implemented as service of one or more servers. Such one or more servers or the entity servers 106 and/or 110 may each be, and/or may each include all or part of, the electronic system discussed below with respect to FIG. 9.

Figure 2:
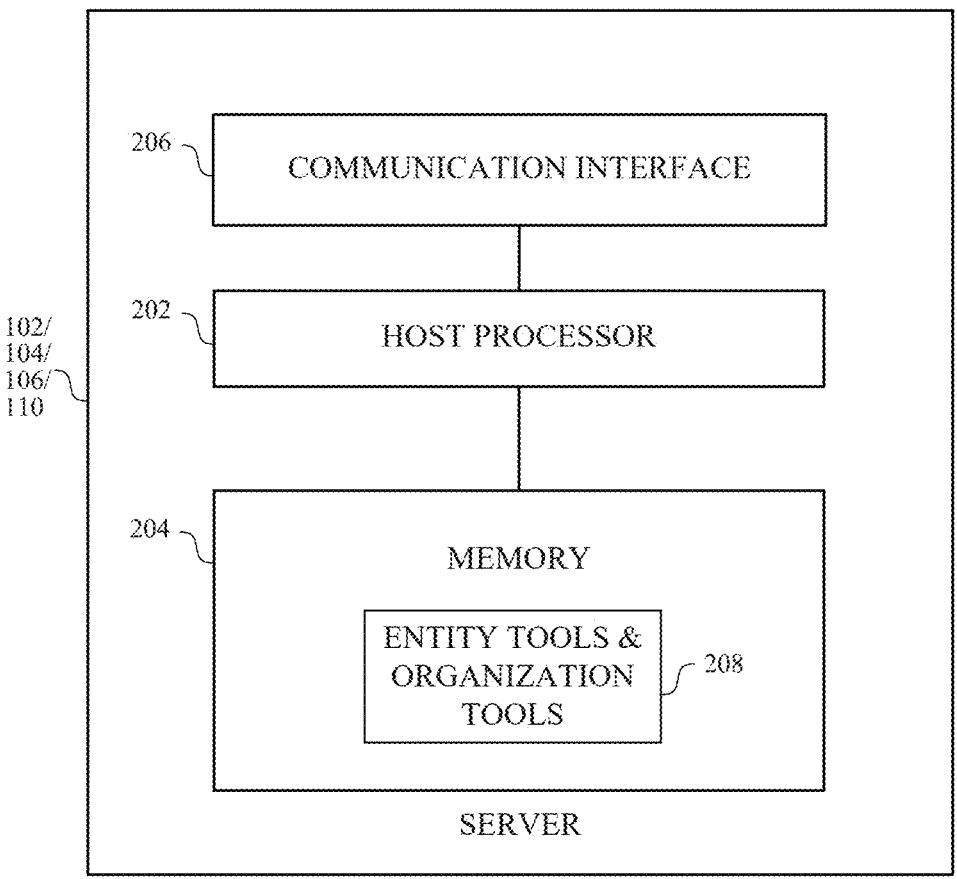
FIG. 2 depicts an example electronic device that may implement the subject technology, in accordance with one or more embodiments.

FIG. 2 depicts an example electronic device 102, organization server 104, entity server 106, or entity server 110 that may implement the subject technology, in accordance with one or more embodiments. For explanatory purposes, FIG. 2 is primarily described herein with reference to the electronic device 102 or organization server 104 of FIG. 1. However, this is merely illustrative, and features of the server of FIG. 2 may be implemented in any other electronic device for implementing the subject technology and/or any other server for implementing the subject technology, such as the entity servers 106 and 108. Not all of the depicted components may be used in all embodiments, however, and one or more embodiments may include additional or different components than those shown in FIG. 2. Variations in the arrangement and type of the components may be made without departing from the spirit or scope of the claims as set forth herein. Additional components, different components, or fewer components may be provided.

The electronic device 102 or organization server 104 may include one or more of a host processor 202, a memory 204, and/or a communication interface 206. The host processor 202 may include suitable logic, circuitry, and/or code that enable processing data and/or controlling operations of the electronic device 102 or organization server 104. In this regard, the host processor 202 may be enabled to provide control signals to various other components of the electronic device 102 and organization server 104. The host processor 202 may also control transfers of data between various portions of the electronic device 102 or organization server 104. The host processor 202 may further implement an operating system or may otherwise execute code to manage operations of the electronic device 102 or organization server 104.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). The memory 204 may include entity tools and organization tools 208 including executable programs, routines, and services that provide the functions described herein. The specific implemented entity tools and organization tools 208 may vary based on whether the memory 204 is in implemented in the electronic device 102, the organization server 104, the entity server

106, or the entity server 110. As noted above, in some embodiments, the entity tools and organization tools 208 may be implemented as a service in another server like unto the organization server 104, but containing multiple servers, e.g., organization server 104 and/or entity server 106 and/or entity server 110, hosted therein.

The communication interface 206 may include suitable logic, circuitry, and/or code that enables wired or wireless communication, such as between the electronic device 102, the organization server 104, the entity server 106, and/or the entity server 110. The communication interface 206 may include, for example, one or more of a Bluetooth communication interface, an NFC interface, a Zigbee communication interface, a WLAN communication interface, a USB communication interface, a cellular interface, or generally any communication interface.

In one or more embodiments, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
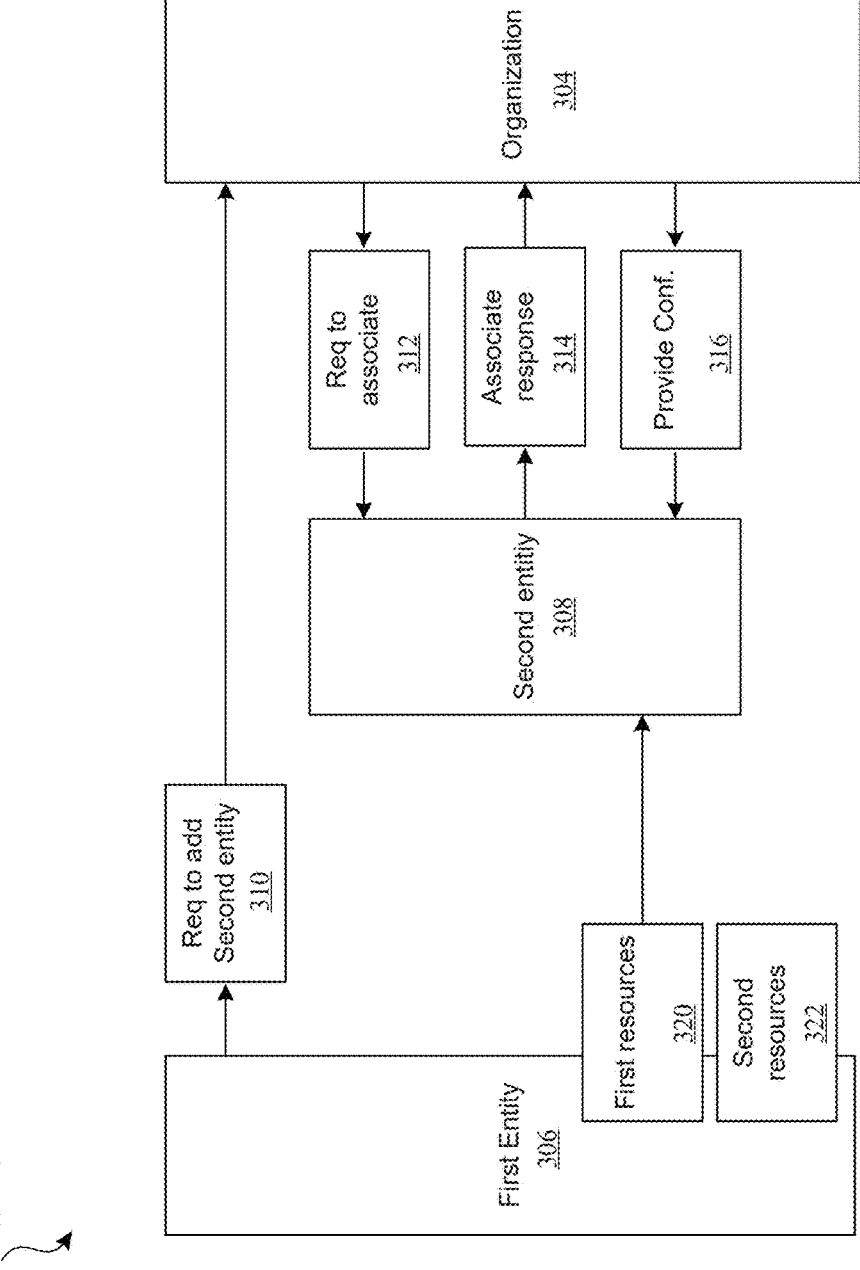
FIG. 3 illustrates a data flow diagram for a for a first entity server, a second entity server, and an organization server, in accordance with one or more embodiments.

FIG. 3 illustrates a data flow diagram 300 between a first entity server 306 (e.g., entity server 106), a second entity server 308 (e.g., entity server 110), and an organization server 304 (e.g., organization server 104). Although the discussion of the data flow diagram 300 proceeds below describing the data flow from block to block, it should be understood that flow can be performed in parallel as appropriate or may flow out of the order described where the associated processes allow for the data flow to differ.

The first entity server, the second entity server, and the organization server may each be respectively owned or under the control of a corresponding first entity, second entity, and services provider. For ease of understanding throughout the following discussion, each of the entities can be thought of as a business that offers goods or services to customers, and the services provider can be thought of as a service provider for each of the businesses which offers various services to the businesses, which may include one or more of, for example, payment processing, subscription management, invoicing, inventory tracking and control, web-based shopping cart tools, point of sale systems, fraud detection, banking services, and customer management, and so forth. Generally, these services are referred to as payment services.

In some embodiments, according to a first use case, the services provider is a third-party to both the first entity and the second entity. In this use case, the first entity and the second entity are each related to each other in some way. For example, the first entity and the second entity may be sibling entities, each being a legal child of a parent company. In another example, the first entity may be a parent company to the second entity or vice versa. In such embodiments, for the purposes of the following discussion, the first entity is a customer of the services provider and utilizes the services provider as a vendor for payment services. The second entity may or may not be a customer of the services provider. If not, then the process described below may also include an onboarding process to make the second entity a customer of the services provider. If so, the second entity may also utilize the services provider for payment services, but the services provider sees each of the first entity and the second entity as separate customers. It is not uncommon, for example, for one entity to be associated with one country's jurisdiction and another entity to be associated with another country's jurisdiction, and for those entities to operate independently due to the different regulations of each country. Or in another situation, it would not be uncommon for one company to have two separate entities that offer different types of core services operated independently.

In some embodiments, according to a second use case, the services provider and either one of the first entity or the second entity may be the same entity, i.e., the first entity server and the organization server are each owned or under the control of the first entity. This may be the case, for example, when the first entity is a large enterprise organization which provides payment services in-house. In such embodiments, the following discussion relates to a second entity which may be a child or sibling of the first entity adjoining to an organization server associated with the first entity for the purpose of accessing the various services provided by the services provider. Thus, to put it simply, in the second use case, there are two entities, and the organization server is under the control or operation of, for example, the first entity for providing services to the first entity.

The following discussion can be applied, for example, to embodiments configured according to the first use case or can be applied to embodiments configured according to the second use case. For the sake of simplicity, however, the discussion below is primarily with regard to the first use case but is not limited thereto. It should also be appreciated that, although the description below is primarily with regard to two entities, additional entities may be included, and are contemplated.

In accordance with some implementations, the actions of the data flow of the data flow diagram 300 may be initiated by an action at a user device or administration device, such as the electronic device 102. The user device, for example, can provide commands to the organization server 304, the first entity server 306, and/or the second entity sever 308 which cause each respective device to execute code by one or more processors associated therewith to effectuate the movement of data as described below. For example, the user device may be associated with the first entity and a user may utilize the user device or administration device to initiate at the first entity server 306 an onboarding process with the organization server 304 to cause a request to associate with the organization data structure of the organization server 304 to be provided to the second entity server 308. In another example, the user device may be associated with the organization.

At block 310, the first entity server 306 can send a request to the organization server 304 to modify the organization data structure to add a second entity to the organization data structure. The request can include contextual information so that the request can be carried out by the organization server 304. For example, the request can include an identifier of the second entity sever 308 and an indication of a credential or authorization that the originator of the request has authority to make the request to both modify the organization data structure as well as modify the relationship of the second entity server 308 to the organization server 304 to include the second entity server 308 as part of the organization data structure. For example, the first entity can send a request to the service provider to add a related company, the second entity, to an organization structure that includes the first entity. When the second entity is already a customer of the service provider, for example, the request can include some information only known because of the relationship between the second entity and the service provider, thereby providing an indication that the first entity is authorized to make the request. The first entity may want to include the second entity in the organization structure, for example, to be able to share payment services from the service provider between the first entity and the second entity. Thus, the request may be considered a request to the organization server to send an invitation to the second entity to associate with the organization structure.

One example may be that the first entity and second entity each provide services. One entity may, for example, provide peer-to-peer short term house rentals, and another entity may provide peer-to-peer short term car rentals. Suppose the housing rental company is more established than the car rental company. The housing rental company may desire to associate with the car rental company in an organization structure of the service provider to be able to provide the car rental company access to customer information, custom tools developed by the housing rental company, rewards programs associated with the housing company, and so forth. Doing so would, for example, significantly decrease the development time for the car rental company by providing a base of potential customers, and for those customers, being able to import payment methods so that the customers can use the platform easier. such tools for the Additional examples are provided with respect to FIG. 4, below.

The organization server 304 can receive the request from block 310. The organization server 304 can verify the identity information of the second entity server 308 and verify the indication of the credential or authorization provided with the request to add the second entity server. If the verification passes and the organization server 304 determines that the request from block 310 is valid, then the organization server 304 can provide, at block 312, a corresponding request to the second entity server 308 to associate the second entity server 308 with the organization data structure. For example, the service provider can verify the authorization information provided by the first entity in the request. Then the service provider can provide a corresponding request to the second entity to determine if the second entity would like to be associated with the organization structure. The request from the service provider may correspond, for example, to an invitation to the second entity to associate with the organization server (and the first entity via the organization server) for the purpose of sharing payment services, such as sharing customer data and customer payment information, sharing inheritable features, such as authorized users, and sharing reporting features, such as customized report configurations. Other information may also be sharable through associating together through an organization structure such as described in further detail below.

The second entity server 308 can review the request to determine if it will associate itself with the organization data structure. As part of reviewing the request, the second entity server 308 can send a notification or request to the user device or administration device associated with access to the second entity server 308, requesting confirmation that an authorized user of the user device or administration device agrees to associate the second entity server 308 with the organization data structure. Upon receiving verification from the user device or administration device from an authorized user, the second entity server 308 can send a response, at block 314, to the organization server 304 indicating a confirmation to associate the second entity server 308 with the organization data structure. The confirmation, for example, can include sending an identifier associated with the second entity server 308 back to the organization server 304 for the organization server 304 to store in association with an organization identifier in the organization data structure. Further, the second entity server 308 can store, in association with data related to the second entity, an identifier according to the organization data structure 304. For example, an authorized user for the second entity, such as a manager, may review the request or invitation to associate with the organization structure and may provide a confirmation response to the service provider. In practical application, the authorized user of the second entity may be expecting the request or invitation. The second entity may want to associate with first entity via the organization structure so that it could receive shared information from the first entity, such as shared customer data and payment resources. Further examples and a discussion of the shared information are provided with respect to FIG. 4.

Upon receiving the response, at block 314, from the second entity server 308 to associate the second entity server 308 with the organization data structure, the organization server 304 can add an identifier of the second entity server 308 to the organization data structure to complete the association. Further, the organization server 304 can provide a confirmation, at block 316, back to the second entity sever 308 that the association was completed. In some embodiments, the confirmation can include sending an organization identifier associated with the organization data structure. For example, the service provider can include identity information for the second entity in the organization structure to signify that the association is complete. The identify information can be used as a key to provide shared resources from one entity to another. For example, the second entity identity information can be added to a data entry that manages which entities have access to a particular customer's information. In some embodiments, the second entity server can be similarly associated with other access lists for tools provided by the service provider.

As noted in FIG. 3, the first entity server 306 can have data items associated therewith including first resources 320 and second resources 322. In some embodiments, the permissions associated with the first resources 320 are set such that they are automatically shared to the second entity server 308. For example, the first resources 320 may be configured to be available to each of the entities associated with the organization data structure by default. On the other hand, the permission associated with the second resources 322 may be set such that they cannot be obtained from the first entity server 306 unless a further request/grant process is undertaken, an example of which is provided with respect to embodiments discussed below. First resources 320, for example, may include customer information for the first entity. The first entity may, however, retain some customer information as the second resources 322. For example, a user's name, address, and communication preferences may be shared to the second entity, but information related to previous or current orders or subscriptions of the customer may be retained by the first entity and not shared unless requested by the second entity or provided to the second entity.

Figure 4:
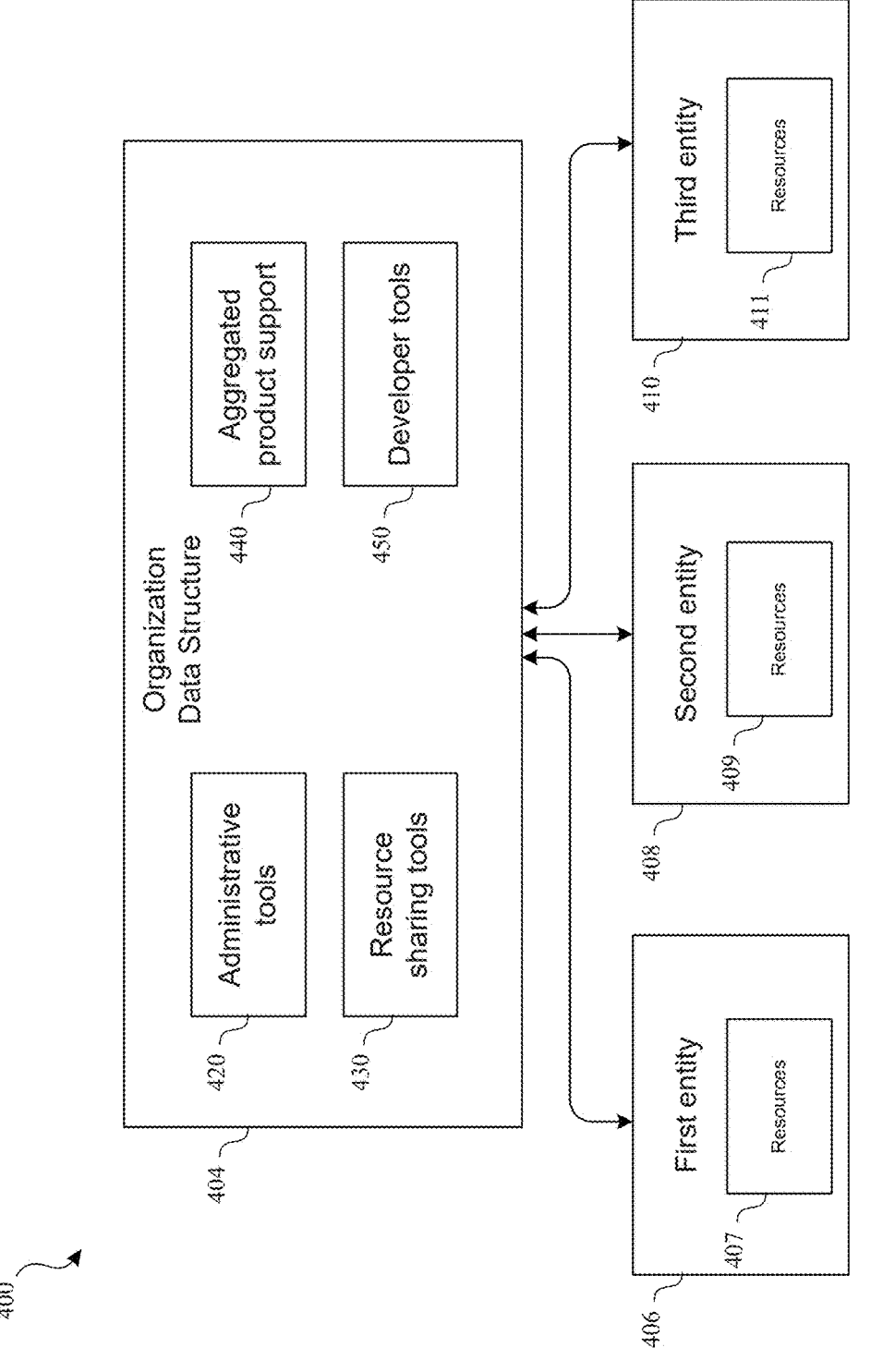
FIG. 4 illustrates a relational diagram illustrated an example shared resource between three entities of an organization, in accordance with one or more some embodiments.

FIG. 4 illustrates a logic diagram 400 illustrating a relationship as stored in an organization data structure between an organization server 404 (e.g., the organization server 104 or 304), a first entity server 406 (e.g., the entity server 106 or 306), a second entity server 408 (e.g., the entity server 110 or 308), and a third entity server 410 (e.g., like unto the entity server 110 or 308). The organization server 404 may provide several tools in association with the organization data structure, such as administration tools, reporting tools, searching tools and so forth, such as described below. Each of the first entity server 406, the second entity server 408, and third entity server 410 may access one or more of such tools of the organization server 404 associated with the organization data structure, for example, in connection with processes to share some or all of resources 407 of the first entity server 406, resources 409 of the second entity server 408, or resources 411 of the third entity server 410 to other entities in the organization, where the resources 407, 409, and/or 411 are related to data respectively associated with the corresponding entities. Similarly, because each of the first entity server 406, the second entity server 408, and the third entity server 410 are associated together in the organization data structure, the organization server 404 may access data and resources associated with respective ones of the first entity server 406, the second entity server 408, and the third entity server 410 to provide aggregated product support, administrative tools, resources, and developer tools, for example, to an authorized user utilizing a user device or administration device, such as the electronic device 102.

For example, each of the first entity server 406, second entity server 408, and third entity server 410 may operate independently, with each one, for example, providing a webpage storefront for selling goods or services. Thus, each one may have customers associated with the webpage. Suppose the first entity, Entity A, sells auto parts, then the customers may be those that have purchased auto parts with the Entity A. Suppose the second entity, Entity B, sells peer-to-peer automobile mechanic services, then the customers may be those that have purchased auto repair services with the Entity B. Suppose the third entity, Entity C, provides access to mechanics for the peer-to-peer automobile mechanic services, then the customers may be mechanics that are offering their services. It could be helpful for Entity A (the auto parts store) to be able to provide customer information to Entity B (the auto repair services provider) so that if a customer is prompted whether they need repair services when buying a part, they can be directed to the Entity B without having to re-input information. In another example, if the mechanic associated with Entity C needs to purchase a part for a repair job, then Entity C (the mechanic service platform) can access a catalog provided by Entity B which can include customized price discounts based on the association with Entity C. Rather than Entity C in such an embodiment requesting catalog information through a data exchange (such as an application programming interface), because they are part of the same organization structure, Entity C can access the catalog as a shared resource of the organization and present the information in a customized manner to the mechanics.

In another example, Entity B may have developed a particular financial reporting tool that can be shared to Entity B and Entity C, in the organization. Entity A, in another example, may have developed and implemented a customer loyalty rewards program that can be shared to the other entities in the organization.

Utilizing the organization data structure, rather than create a new account for each entity or business unit, users can utilize the organization data structure to bring entities under a unified organization. Management of accounts can be performed in one place, e.g., by accessing the controls associated with the organization rather than an individual entity. After an organization is created, the administrative and operational tasks are consolidated into a single location, rather than bouncing between accounts to manage team members or search for invoices. Team management can be centralized. In some embodiments, a dashboard can be provided for an administrator of the organization server or of an entity associated with the organization structure. The organization server 404 as illustrated in FIG. 4, in addition to being part of the logic diagram 400, the illustrated diagram can also be considered to be an example of a dashboard interface with different tools available to the user of the system. Logging into the dashboard may include entering an administrator username and password. Depending on the access granted to that username, the dashboard may display information related to one or more entities and/or the organization.

The administration tools 420 may include, for example, tools such as those described herein to create an organization structure and attach or interrelate entities or accounts to the organization structure. For example, selection of the administrative tools 420 can bring the user to a sub-menu including a variety of different tools. One option under the sub-menu can be to create an entity and/or join an entity to the organization structure, such as sending a request to an entity not currently part of the organization structure. Security information associated with existing entities can be provided to make onboarding entities more efficient. For example, in some embodiments, onboarding an entity into the organization can use know-your-business security factors which can be used to verify that one business has permission to request to add another business in an automated handshaking process, which may correspond to the data flow described above with respect to blocks 310, 312, and 314. The know-your-business factors can be provided as the data exchange noted therein. Thus, for example, the dashboard allows users from Entity A to create an organization structure and add entities, such as Entity B and Entity C to the organization structure. Creating a new organization does not impact payment integration of existing entities and does not impact payment experiences for customers.

Another option under the sub-menu for the administrative tools 420 can be to select consolidated reporting tools. For example, reporting mechanisms associated with each account or entity which are associated with the organization can be utilized. The output of the reporting mechanisms, e.g., retrieving data for each report, can be provided to a report function for the organization. The organization can then combine the reporting data and generate a report that provides consolidated and correlated reporting across the entire organization. Centralized reporting can therefore be utilized to create a report across the entire organization that might have taken days to complete by manually generating reports, normalizing reporting formats, and consolidating reports into a single report. Instead, the centralized reporting can use the report functions of each entity to generate a report, then use a built-in, automatically generated, or user-specified template to normalize an aggregated report with common data fields across all entities. The reporting tools can include centralized and simplified financial reporting using the organization server and organization data structure to drive data collection and analysis across all the entities associated with the organization data structure. This can helpfully provide the ability to aggregate reports from all entities rather than having to download individual reports and aggregate them manually. The reporting tool can provide customized results for the purposes of financial planning and analysis. For example, the organization server can automatically aggregate financial and growth metrics from each of Entity A, Entity B, and Entity C, creating a report at the organization level. Reports can be customized by providing the ability for users to build queries across the entities of the organization structure and download consolidated reports. For example, custom and templated SQL queries can be run to aggregate data across all entities of the organization data structure and obtain business insights. The organization, for example, can generate a customer report across each of Entity A, Entity B, and Entity C the entities using custom SQL queries or through a query build tool. Customers can be identified which are most likely to churn, which most contribute to revenue across entities, and the like. Also, consolidated reports, including balance, activity, and reconciliation reports, can be aggregated from each of Entity A, Entity B, and Entity C into a consolidated reporting tool, providing a variety of reports which can be exported per Entity or per a group of Entities. Balance reports can identify cash-flow issues with each entity, activity reports can show sales trends over time, and in the case of Entity C (mechanic services), for example, activity reports can track growth of mechanic sign-ups, comparing mechanics who sign-up with mechanics who leave. Financial reconciliation reports can be seen for the entire organization structure and exported for each entity.

In an example, all the sales for the first entity 406, the second entity 408, and the third entity 410 can be provided in a single report. Further, with a combined report, statistical analysis can be run against the report to look for trends that span all of the businesses in the organization and/or differentiate one business from another in the organization. For example, a report including the sales information for each of Entity A, Entity B, and Entity C can be run to aggregate the sales information. Unified reports can offer filtering, for more granular looks at the health of each entity associated with the organization. Such aspects, provide more efficient process workflows and help managers identify possible issues with the financial health of each entity and the organization as a whole. Some business information across all the entities that can be provided include, for example, gross volume or a number of refunded payments.

Another tool that can be provided in the sub-menu of the administration tools 420 may include global search across all the entities or accounts associated with the organization data structure. Searching transaction information across all businesses of the organization can provide the ability for a user to look for trends and information across all businesses rather than just a particular business. In embodiments, the search function of the administration tools 420 may pass a search query along to each entity associated with the organization, obtain the results from the multiple queries, combine the results, and provide the aggregated results. The search tools can provide the ability to group results by entity or sort by relevance based on a relevance score associated with each search result. Searching across accounts can enable team members to search for business information across all accounts so they can respond to customer support inquiries faster, make more informed decisions, and track payments trends across the entities associated with the organization data structure. Entity A, for example, can search customer and payment information across all the accounts and/or entities to determine if a particular transaction should be flagged as suspicious. In another example, Entity B can search transactions involving particular mechanics and cross-reference those with parts sales from Entity A to look for trends that can be flagged. For example, it can be determined that some mechanics are purchasing parts from other sources, and they can be offered extra promotions as an encouragement to purchase parts from Entity B.

Another tool that can be provided in the sub-menu of the administration tools 420 may include team management features to add, change, or delete team members to or from the organization or to an entity of the organization. Team members can be assigned to pre-configured security roles so that updating permissions for team members can be managed on an organization-wide scale. For example, a team member can be assigned a role which provides access to the first entity server 406 and a role that provides access to the second entity server 408, but not assigned to a role that provides access to the third entity server 410. Built-in or custom roles can be assigned that are inherited across the entities associated with the organization data structure, eliminating the need to manually log into each entity to adjust permissions. For example, if an employee leaves the company or changes teams, a single change to the employee status can remove permissions from the employee across the entire organization structure. As part of the team management features, single-sign on can be provided so that users can sign onto each entity of an organization using a single sign on, regardless of the sign-on settings associated with that entity. This provides easier access as a user navigates around the dashboard. Single sign-on can be configured for use centrally across the organization while still maintaining granular access to each entity. Validation of identity can be configured to occur once and then authentication can automatically propagate across all accounts with access. For example, each tool of dashboard may be implemented by different backend application processes. As a user navigates the dashboard from one application to another, the user can do so without having to sign into each application because the organization server can provide credentials to each application upon access. This provides separability and security for the applications, but also eases the use of using the applications for an authenticated user.

Another tool provided in the sub-menu of the administration tools 420 includes tools for centralized billing, which can be used to provide negotiated rates to all accounts or entities in an organization. Centralized billing in this manner can benefit a smaller entity, for example, if the third entity is smaller than the first entity, then it may not have the leverage to obtain negotiated rates from the service provider (e.g., of the organization server 404). Grouping the entities together in the organization structure, however, can allow all the entities to make use of the best negotiated rates with the service provider among all the entities. Centralized billing also provides a beneficial way for the entities to determine which fees belong to which entity and may parse them out to each entity or combine them to handle together in some consolidation.

Additional tools of the administration tools 420 provide the ability to create sub-organization structures or groups of entities. The groups can be used to provide partially consolidated search or reports or filtering based on the groups, in a similar manner as those provided for the organization. This can allow the organization to bring all entities under the same organization structure, but still allow some separation between entities that have disparate business models. For example, suppose a fourth entity is a sibling to the first, second, and third entities, and the fourth entity is an ice cream shop. It may make sense to group the first, second, and third entities in one group, but leave the fourth entity out of that group, but still part of the organization structure.

Additional tools of the administration tools 420 can set preferences. One example, may be settings for notification preferences. Notification preferences can be set for a variety of triggers that may automatically generate a notification and send the notification to a specified user. In some embodiments, the notifications can be set at the organization structure level, which may be inherited by each of the entities associated with the organization. Each entity, however, may override an inherited preference to indicate alternative notification preferences. For example, a default risk threshold may be set for an organization, however, a particular entity may override the risk threshold. For example, the first entity may sell to the public, which may indicate a first threshold for risk notifications, whereas the second entity may sell to businesses, which may indicate a second risk threshold for risk notifications which may be higher than the first threshold (more difficult to trigger a risk event).

Additional tools of the administration tools 420 can include fraud detection and reporting tools. Through transaction sharing, more data points are available to a fraud detection process that receives transaction information, analyzes the transaction information, and flags suspicious activity as being potentially fraudulent. For example, if a transaction at Entity A was determined to have been originated from another country, it could be flagged as being possibly invalid. Additionally, fraud detection can be implemented by looking at transactions across all the entities rather than individually.

The resource sharing tools 430 may include, for example, tools such as those described herein to share customer information and payment methods or other modalities between entities belonging to the organization data structure. Resource sharing tools 430 can also include sharing a terminal reader between entities of an organization data structure. Sharing a terminal reader can enable a terminal reader of one entity to process transactions associated with another entity. Resource sharing tools 430 can also provide legal entity sharing. Rather than every legal entity requiring its own account, an account may be shared by multiple legal entities, and likewise allow a legal entity to have multiple accounts along with other legal entities.

Aggregated product support 440 may include, for example, statistical queries across multiple accounts and multiple entities for the entire organization; organization-level configuration of terminal readers, locations, and access across the organization; consolidated artificial intelligence powered fraudulent transaction detection across the entire organization; payment and dispute information across the organization; and billing across the organization.

The developer tools 450 may include, for example, organization level application programming interface (API) keys which can be used to create unified API integrations across the organization with a single API key, along with request signing for enhanced security for API requests. A single API key for the organization, for example, can simplify access to various available APIs, either provided by third-parties or by the organization server 404. APIs provide an access to remote functions where data is provided to the API and then other data is returned. For example, one API may be for sending transaction information to the API and returning location information for the vendor at the point of sale of the transaction and for the payor using stored customer information or payment supplied location information, such as a zip code data. A single API key for the organization can enable each entity to utilize the same access to the API, for simplified management of the access to the API. Sandbox organizations can be provided for test creating organizations and resource sharing in sandboxes before going live. A sandbox organization, for example, can be used to create a copy of the entity and organization data in a protected and isolated environment. Once created, a snapshot of the sandbox can be made. Then, a developer can initiate a mock-organization creation and affiliation for the sandbox entities. Once created the organization can be data tested to determine and ensure that the creation and affiliation to the organization was successful. In some embodiments, real transactions can be copied to the sandbox organization for a trial run for the organization combination. In some embodiments, the user or developer can utilize the dashboard to make the sandbox live, swapping the first entity server 406 with the sandbox first entity server, the second entity server 408 with the sandbox second entity server, the third entity server 410 with the sandbox third entity, and the organization server 404 with the sandbox organization server. Developer tools 450 may also include being able to configure centralized event destinations for all accounts and entities associated with the organization data structure. For example, the organization server can send events associated with transaction processing for entity data at the organization level to webhook endpoints and cloud services. For example, event destinations can provide data automatically to applications run by one of Entity A, Entity B, or Entity C, the data being provided at the organization level and including event data as well as an entity associated with the event data. For example, the event destination may be triggered when a customer confirms payment, when a customer disputes a charge, or when a user makes a successful recurring subscription payment.

FIG. 5 illustrates a flow diagram of an example process 500 for providing from a server, such as the organization server 104, 304, or 404, a mechanism for associating an entity identifier with an organization data structure. For explanatory purposes, the process 500 is primarily described herein with reference to the organization server 104, 304, or 404. However, the process 500 is not limited to these, and one or more blocks of the process 500 may be performed by one or more other by other suitable devices. Further, for explanatory purposes, the blocks of the process 500 are described herein as occurring sequentially or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, process 500 may include receiving, at a server, a request to add a second entity to an organization data structure, where the organization data structure includes an association with a first entity having first resources and second resources. The request can correspond to the block 310 discussed above with respect to FIG. 3. Associating the second entity can also result in associating each server associated with the second entity, in accordance with some embodiments.

At block 504, process 500 may include sending, by the server to a device associated with the second entity, a request to associate the second entity with the organization data structure. The request can correspond to the block 312 discussed above with respect to FIG. 3.

At block 506, process 500 may include receiving, by the server, a response from the device associated with the second entity indicating to associate the second entity with the organization data structure. The request can correspond to the block 314 discussed above with respect to FIG. 3.

At block 508, process 500 may include associating the second entity with the organization data structure by: providing, from the server to the device associated with the second entity, an organization identifier to be stored in association with the second entity, and storing, by the server, a second entity identifier associated with the second entity, where upon associating the second entity with the organization data structure, the second entity gains access to the first resources and not the second resources. As discussed above, the ID of the second entity server can be stored at the organization data structure and the ID of the organization can be stored in association with the second entity. In some embodiments, each server associated with the second entity can likewise be associated with the organization data structure.

In accordance with some embodiments, after the second entity is associated with the organization data structure, a billing event reflecting a preferred rate between the first entity and the second entity can be provided to both the first entity and the second entity. For example, the first entity may have a billing rate for payment processing services and the second entity may have a second billing rate. By associating the entities to the organization, the most favored billing rate can be applied for each entity.

In accordance with some embodiments, the process 500 can also include, in response to a request for a search for data related to the organization as provided in the organization data structure, providing search results including an aggregation of search results from the first entity and the second entity. Searching can be executed at the organization level by, for example, searching each entity individually and consolidating the search results at the organization level automatically.

In accordance with some embodiments, the process 500 can also include, in response to a report request for the organization as provided for in the organization data structure, providing a report including report records from both the first entity and the second entity, and metrics derived from both the first entity and second entity. Report building can utilize the individual entity reporting mechanisms and provide one or more combined reports that provide information across all entities in the one or more combined reports.

Figure 6:
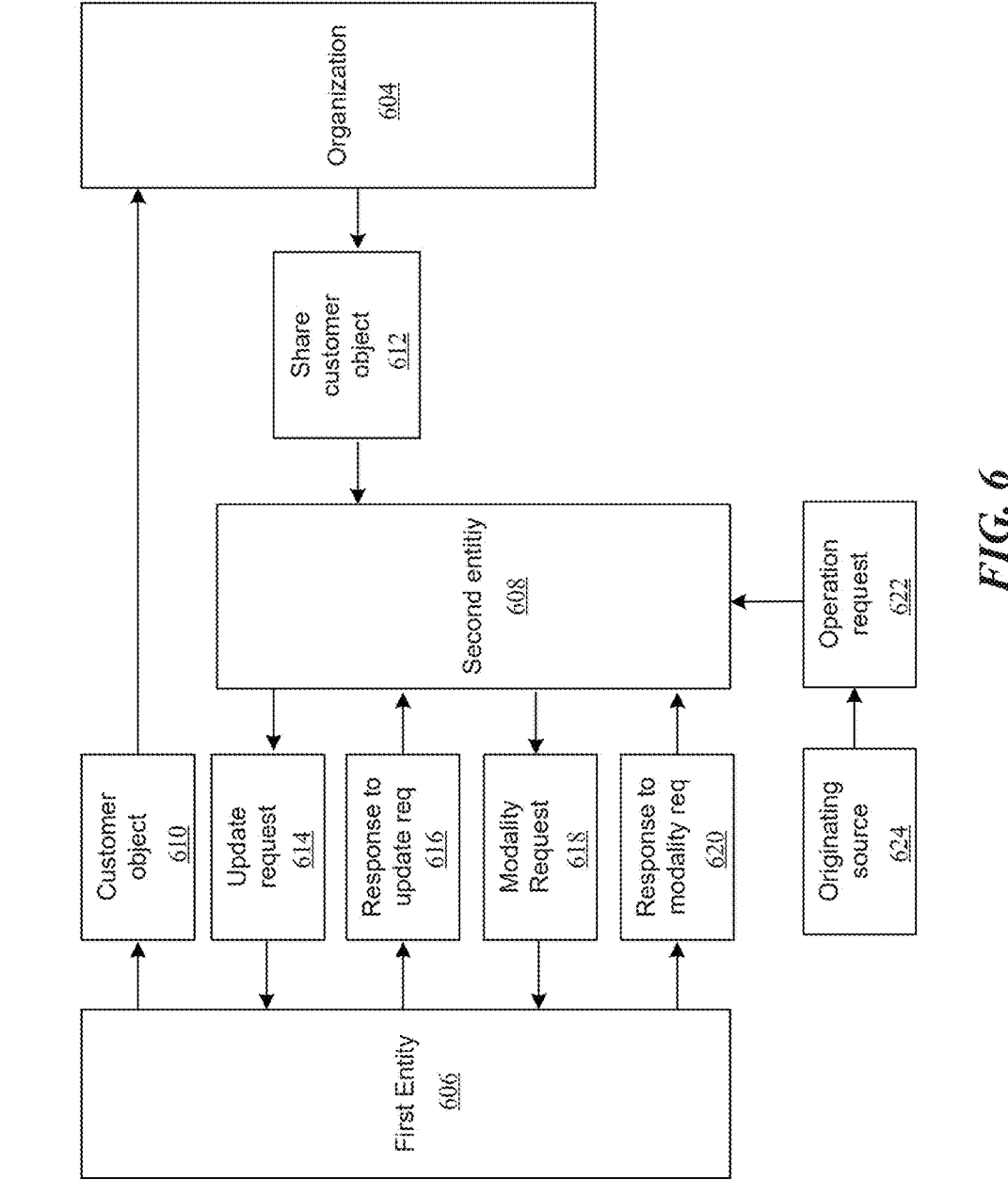
FIG. 6 illustrates a data flow diagram for a first entity server, a second entity server, and an organization server, in accordance with one or more some embodiments.

FIG. 6 illustrates a data flow diagram 600 between a first entity server 606 (e.g., entity server 106, 306, 406), a second entity server 608 (e.g., entity server 110, 308, 408), and an organization server 604 (e.g., organization server 104, 304, or 404). Although the discussion of the data flow diagram 600 proceeds below describing the data flow from block to block, it should be understood that flow can be performed in parallel as appropriate or may flow out of the order described where the associated processes allow for the data flow to differ.

By way of explanation, an example is discussed with regard to the following flow. The example is similar to that discussed above where the first entity server may be associated with or under the control of Entity A, the second entity server may be associated with or under the control of Entity B and the organization server may be associated with or under the control of a services provider. Entity A may be an auto parts store, Entity B may be a mechanic service provider, and Entity C (discussed with respect to FIG. 7) and associated with the third entity server 710 may be a service where mechanics can sign up to be used in the mechanic service provide Entity B.

In accordance with some implementations, the actions of the data flow of the data flow diagram 600 may be initiated by an action at a user device or administration device, such as the electronic device 102. The user device, for example, can provide commands to the organization server 604, the first entity server 606, and/or the second entity server 608 which cause each respective device to execute code by one or more processors associated therewith to effectuate the movement of data as described below. For example, a user may utilize the user device or administration device to initiate at the first entity server 606 a process to share a customer object with an organization server 604 which can share the customer object to a second entity 608 associated with the organization data structure to cause the second entity 608 to have shared access to the customer object. It should be appreciated that although a "customer object" is discussed herein, the word "customer" may be replaced with the word "resource" in the description below and the data flow below can be applied to any sharable resource object. For example, the customer object can be thought of as a data container that includes customer information. The customer information can include general customer data, such as name, address, state, zip code etc., and in some embodiments can also include customer specific information, for example, as a sub-container of the customer object. For example, Entity A may have customer information associated with it, and as an auto parts store, may have entity-specific information for each customer, such as year, make, and model of one or more vehicle associated with the company. In this example, the year, make, and model may also be relevant to Entity B, as a mechanic services company, however, it may not be relevant to other entities of the organization.

At block 610, a customer object can be (e.g., a customer data and vehicle data associated with the customer object) sent from the first entity server 306 to the organization server 604. In some embodiments, this can be done in response to a request from the second entity server 608, via the organization server 604, to share a customer object. In some embodiments, this may be performed as a part of an onboarding process to share customer objects with the organization server 604, which can then be propagated to another entity server as needed. For example, an authorized user using a user device or administration device, can send a request to the first entity server 606 to provide a particular customer object at block 610. In another example, a customer associated with the customer object can send a request to the first entity server 606 to provide their customer data (e.g., the customer object) to a related entity of the organization data structure. For example, the customer may be interacting in a service website provided by the second entity and may request that their customer account be shared with the service website provided by the second entity rather than create a new customer account. In another example, the customer may be interacting in a service website provided by the first entity and may request that their customer account be shared with the second entity to automatically set up an account at a service website provided by the second entity.

At block 612, the customer object can be shared to the second entity server 608. The shared customer object may include general customer data and additional customer data may be retained by the first entity server 606. For example, in the example, case the shared customer object may include the general customer data and may include vehicle information associated with the customer. The shared customer object may include a pointer to a customer object and an authorization to access the customer object according to a set of access permissions. In other words, the customer object need not be copied to the second entity server 608, but a reference can be provided to the second entity server 608, such as a record reference and metadata, which together can be used access the customer object. The second entity server 608 may establish additional data related to the customer object which is particular to the second entity server 608. For example, Entity B may have specific customer data particular to the customer that Entity A does not need. Entity B can store this as its own customer object, which together with the customer object from Entity A establishes all the customer information. Entity B may collect data for the customers which does not pertain to Entity A. For example, Entity B may track when routine services are needed, such as tire rotations and oil changes, and may include this information as customer object specific to Entity B. Each entity server which initiates the customer object may retain primary control or primary authority over the customer object. Primary control or primary authority provides permissions to the respective entity server to update or delete data from the resource and likewise may restrict updating at least some of the data or deleting some of the data associated with the customer object. Update access to a resource can be permitted through the access permissions for the shared customer object. For example, a customer may have established an account with Entity A and purchased an auto part from Entity A. Later, the same customer may have purchased mechanic services from Entity B. When customer purchases from Entity B for the first time, the customer may be asked to share the customer profile from Entity A with Entity B. Upon permission from Entity A, the customer is established as a shared customer from Entity A to Entity B, however, because Entity A had established the customer first, Entity A can have primary control or primary authority over the customer object. As primary authority, Entity A can restrict or allow updates to the customer object. For example, if the customer associated with the customer object has an order pending, then Entity A may lock some of the customer information from being changed by another entity while the order is processing. Or in another example, customer data specific to the Entity A may be locked from being edited by another entity.

At block 614, when the second entity server 608 does not have permission to update a shared customer object, the second entity server 608 can send a request to update the customer object to the primary authority over the customer object, which in this case is the first entity server 606. The request can include the data to be updated. In one example, the update request may be an update to the data of the customer object. In another example, the update request may be a request to transfer the primary authority for the customer object from the first entity server 606 to the second entity server 608. At block 616, the first entity server 606 can provide a response to the update request. In the case where the update request was to update the data of the customer object, the first entity server 606 may either perform the update or not perform the update and in either case, provide a notification or response back to the second entity server 608 with information on whether the update was successful or not. In the case where the update request was a request to transfer the primary authority for the customer object from the first entity server 606 to the second entity server 608, the first entity server 606 may either allow the transfer or not, and in either case, provide a notification or response back to the second entity server 608 with information on whether the update was successful or not. In some embodiments, the request at block 614 may include information indicating an origination of the request. For example, if the request is originated from the customer associated with the customer object, then the request may be allowed and implemented by the first entity server 606. If, however, the request is originated from an administrator of the second entity server 608 who does not have authorization in the first entity server 606, the request may be denied. For example, because Entity A and Entity B are part of the same organization, the customer can make changes to their profile at a website of either entity, but some values may be restricted to be changed only by an entity with primary authority. If Entity B does have permission, Entity B can make the change. If not, Entity B can request to update the value from Entity A, or may request from Entity A and/or the organization server 604 to transfer primary authority to Entity B. The update request can be performed by Entity A on behalf of Entity B, or the primary authority can be changed and transferred to Entity B. Entity A can allow or disallow transfer, but if allowed, then the primary authority can be transferred to Entity B and the change can be made.

At block 618, the second entity server 608 may request to have a modality associated with the customer object under the primary authority of the first entity server 606 to be shared to the shared customer object of the second entity server 608. As used herein, modalities can include payment related objects associated with the customer object and can include any kind of method of payment or a payment-related instrument or program. As noted above, modalities can include, for example, a banking object, a brokerage object, a payment authorization object, a coupon object, a discount object, a rewards object, a credit object, a debit object, a gift card object, and the like. Modalities can be associated with payment instruments, as appropriate, such as bank cards, credit cards, debit cards, health savings account cards, flexible spending account cards, and so forth.

Aspects of the subject technology provide for such modalities to be shared from one entity to another. Because these modalities are tied to the customer objects, if a customer object is shared from one entity server to another entity server, then the corresponding modalities associated with a customer object or a shared customer object may also be shared from one entity to another. Each modality is, in a sense, its own object and thus has attached to it permissions or access privileges which can initially limit the modality from being shared to the shared customer objects.

In some embodiments, some modalities can be associated with shared customer objects at an entity server and not with the customer object kept by the primary authority. In other embodiments, the primary authority for the customer object can access all the modalities. In some embodiments, the modalities can be set with particular authorization limits. For example, a modality can be shared but limited to a transaction amount.

At block 620, the first entity server 606 can respond to the modality request, for example, sharing the modality to the second entity sever 608 or denying the sharing of the modality to the second entity server 608.

At block 622, an operation request can be sent to the second entity server 608. The operation request can be originated from an originating source 624, such as from a customer device accessing a resource associated with the second entity server 608, such as a website operated by the entity in control of the second entity server 608. The originating source may be a user device or administration device authorized for managing the second entity server 608. The operation request may be to perform the customer object sharing previously discussed, perform the customer object update request, e.g., at block 614, as previously discussed, and/or to access a modality at the second entity sever 608, which is not yet shared with the second entity server 608, thereby triggering the modality request, e.g., at block 618, as previously discussed.

Figure 7:
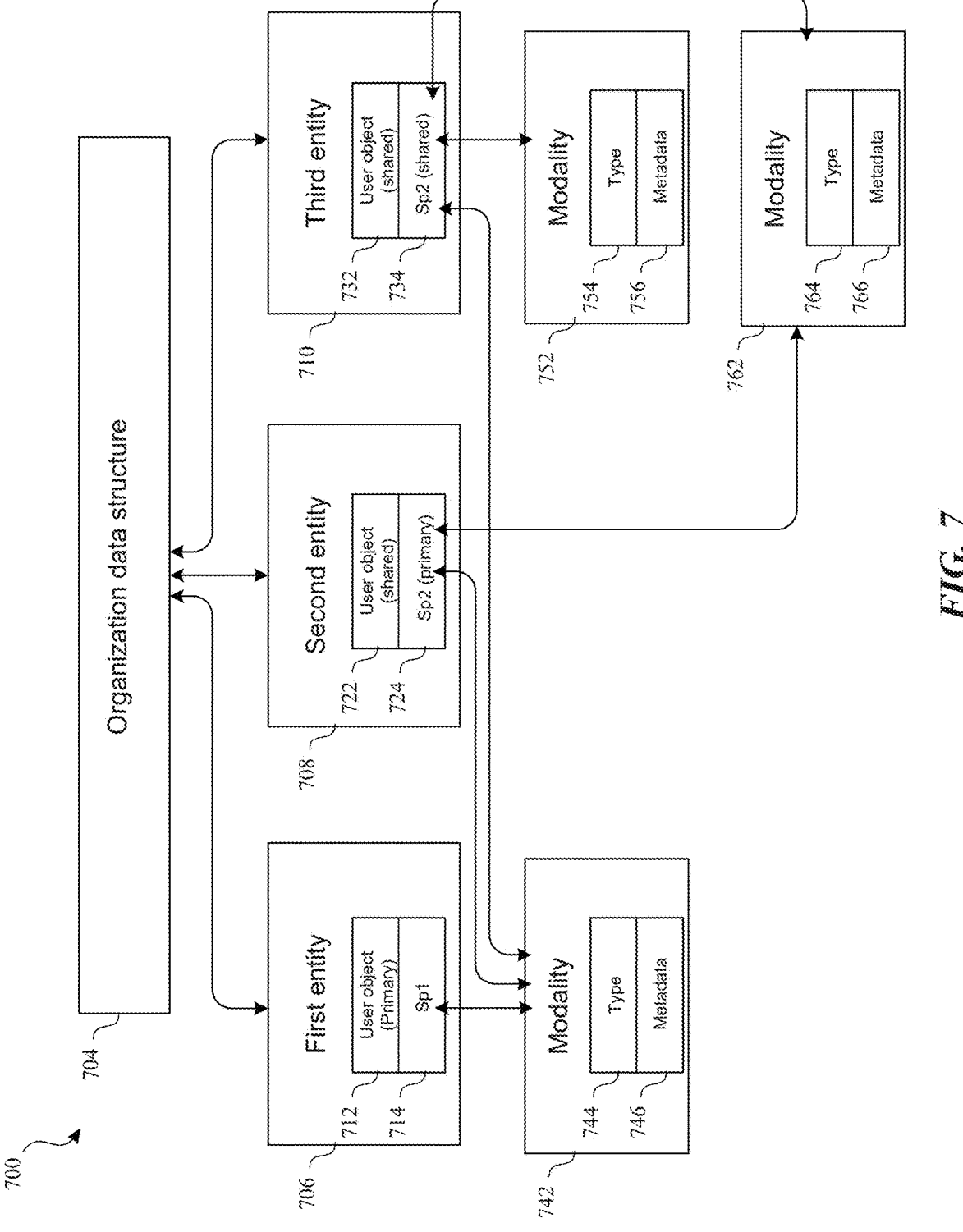
FIG. 7 illustrates a relational diagram illustrated an example shared resource between three entities of an organization, in accordance with one or more some embodiments.

FIG. 7 illustrates a logic diagram 700 illustrating a relationship between an organization server 704 (e.g., the organization server 104, 304, 404, or 604), a first entity server 706 (e.g., the entity server 106, 306, 406, or 606), a second entity server 708 (e.g., the entity server 110, 308, 408, or 608), and a third entity server 710 (e.g., the third entity server 410). The logic diagram 700 may be understood to be an extension of the logic diagram 400, discussed above, for example, after one or more processes associated with the data flow diagram 600 have been performed. The first entity server 706 includes a customer object 712 and is the primary authority over the customer object 712. The customer account associated with the customer object 712 can also include specific data Sp1 for the customer, for example, as a separate specific customer object 714 which is not shared when sharing the customer object 712. The second entity server 708 includes a shared customer object 722. The customer account associated with the shared customer object 722 at the second entity server 708 can also include specific data Sp2 for the customer, for example, as separate specific customer object 724. The second entity server 708 can be the primary authority over the specific customer object 724. The third entity server 710 includes a shared customer object 732 and shared specific customer object 734 corresponding to the specific data Sp2. The customer account associated with the shared customer object 722 at the second entity server 708 can also include specific data Sp2 for the customer, for example, as separate specific customer object 724 which was shared from the second entity server 708.

By way of explanation, an example is discussed with regard to the diagram of FIG. 7. The example is similar to that discussed above where the first entity server may be associated with or under the control of Entity A, the second entity server may be associated with or under the control of Entity B and the organization server may be associated with or under the control of a services provider. Entity A may be an auto parts store, Entity B may be a mechanic service provider, and Entity C may be a service where mechanics can sign up to be used in the mechanic service provide Entity B.

It should be understood that the logic diagram 700 may include additional entities and additional permutations of the user objects and/or shared user objects.

Three modalities are illustrated in the logic diagram 700, and it should likewise be understood that these are provided as examples and additional modalities may be used as needed. As noted above, as used herein a modality can include any kind of method of payment or a payment-related instrument or program. Modalities are associated with customer objects. For example, the arrow between the modality 742 and the first customer object 712 of the first entity demonstrates that the modality 742 is associated with the customer object 712. The modality 742 may include a type 744 and metadata 746. The modality 752 may include a type 754 and metadata 756. The modality 762 may include a type 764 and metadata 766. The type 744, 754, and/or 764 may each correspond to a modality type, such as any of those previously mentioned. The metadata 746, 756, and/or 766 may each include respective authorizations or parameters related to the respective modality. Each of the modalities 742, 752, and 762 are illustrated as being logically related to the customer objects. It should be noted that the arrows depicted in the logic diagram 700 are directed to the customer objects in general, i.e., either or both of the customer object 712 and specific customer object 714, either or both of the customer object 722 and specific customer object 724, and either or both of the customer object 732 and specific customer object 734. For example, the modality 742 may correspond to a debit card, the modality 752 may correspond to a credit card, and the modality 762 may correspond to a gift card. A modality can be initially established with each respective entity at the time of first use. For example, the debit card of the first modality 742 may have been used to purchase a part from Entity A.

As can be seen in the illustrated logic diagram 700, the modality 742 may be shared with the customer object of the first entity server 706, the customer object of the second entity server 708, and the customer object of the third entity server 710. The modality 752 may be shared with the customer object of the third entity server 710 and not the others. The modality 762 may be shared with the customer object of the second entity server 708 and the third entity server 710, and not the first entity server 706. After the modalities are shared with the customer objects, then customers or administrators can authorize an intention to use a particular modality associated with the customer objects. For example, the debit card first modality 742 may be requested to be shared to Entity B. Entity A can share the modality 742 based on permission settings established by the customer object 712. Once the modality 742 is shared with the Entity B, when the customer attempts to purchase services from the Entity B, the payment information may be included from the shared modality. Any payment authorization related to modality 742 as it relates to Entity A may not be shared with Entity B and so the customer can request authorization from the debit card associated with the modality 742 through Entity B.

FIG. 8 illustrates a flow diagram of an example process 800 for providing from a server, such as the organization server 104, 304, 404, 604, or 704, or the entity server 110, 308, 408, 608, or 708, an association of a customer object from one entity server to another entity server. For explanatory purposes, the process 800 is primarily described herein with reference to the organization server 104, 304, 404, 604, or 704. However, the process 800 is not limited to these, and one or more blocks of the process 800 may be performed by one or more other by other suitable devices. Further, for explanatory purposes, the blocks of the process 800 are described herein as occurring sequentially or linearly. However, multiple blocks of the process 800 may occur in parallel. In addition, the blocks of the process 800 need not be performed in the order shown and/or one or more blocks of the process 800 need not be performed and/or can be replaced by other operations. For the purposes of discussion, examples discussed above are continued in the discussion of FIG. 8.

At block 802, process 800 may include adjusting, by a server, access privileges of a customer object of a first entity to provide access to the customer object to a second entity that is associated with the first entity in an organizational data structure, where the first entity comprises an organization identifier corresponding to the organizational data structure, where the second entity comprises the organization identifier, where the customer object has associated therewith at least one account object, the at least one account object including one or more modalities associated therewith. Associating the customer object to a second entity can be performed using processes described in conjunction with blocks 610 and 612. The account object associated with the customer object may include one or more modalities, and in some embodiments may represent a grouping of modalities under a parent object as the account object. In other embodiments, the server referenced may be a server associated with the second entity, while in other embodiments, the server referenced may be a server associated with the organization data structure. For example, Entity A may share a customer object with Entity B by including access privileges to the customer object and providing to Entity B, a pointer to the customer object.

At block 804, process 800 may include receiving, at the server, an operation request associated with the second entity with regard to the shared customer object. The operation request may correspond to the operation request of block 622 discussed above, the operation request including, for example, a request to update a customer record, a request to change the primary authority for a customer object, and/or a request to share a modality. In some embodiments, the operation request may correspond to a customer attempting to make a payment using a saved modality at one entity in connection with another entity, thereby triggering a cycle to request sharing the modality of the one entity with the other entity. In accordance with some embodiments, the request can be made from the second entity to the server associated with the organization, e.g., rather than directly to the first entity, however, both options are contemplated herein. For example, a customer at a website associated with Entity B may request a change to their address or some other change. In another example, the customer may request that their payment information from a modality associated with Entity A be shared to Entity B.

At block 806, process 800 may include providing, by the server, an option to associate the at least one account object to the shared customer object. The server can provide via the second entity an option to associate the account object to the shared customer object of the second entity. The server can, for example, provide the modality request discussed above with respect to block 618 to the first entity either directly or on behalf of the second entity, in accordance with some embodiments. For example, Entity A can be provided with the request initiated by the customer. The request may come directly from Entity B or may be provided by the organization server.

At block 808, process 800 may include, after receiving an indication to associate the at least one account object to the shared customer object, executing, by the server, the operation request using the at least one account object. Once the account object is associated with the shared customer object, a modality of the account object can be used to fulfil the operation request, such as a request to process a payment according to the modality. For example, the modality associated with Entity A may be provided to Entity B, and further, a payment authorization may be initiated after sharing the payment modality, based on the customer request.

The process 800 may further include associating a first modality of the at least one account object with the shared customer object of the second entity, while forgoing associating a second modality of the at least one account object with the shared customer object. For example, if multiple different modalities are associated with the account object, one can be granted access to the shared customer object and associated therewith, while another modality may not be granted access, thereby forgoing associating at least one of the modalities. For example, a first modality may correspond to a first authorized mode of payment associated with the at least one account object, and a second modality may correspond to a second authorized mode of payment associated with the at least one account object, which may not be shared with the shared customer object.

The process 800 may include that the first entity is designated as a primary entity for the customer object, where a designation of primary for an entity provides exclusive access rights to modify all aspects of corresponding customer objects. The process 800 may also include receiving an update to the customer object, the update associated with the first entity; and applying the update to the customer object based at least in part on the first entity being designated as the primary entity, the update causing the shared customer object to also update. The process 800 may further include receiving an update to the customer object, the update associated with the second entity; and forgoing applying the update to the customer object based at least in part on the first entity being designated as the primary entity. For example, if a requested update cannot be completed because the entity receiving the request is not the primary authority for the entity, then the update may not be applied. However, the process 800 may further include requesting permission to modify the customer object from the first entity; and upon receiving permission to modify the customer object, applying the update to the customer object. The process may further include receiving a request to designate the second entity as the primary entity for the customer object; and designating the second entity as the primary entity for the customer object.

Returning briefly to the process 500 described above, the process 500 can utilize the customer object and resource or modality sharing described above. For example, the process 500 may further include providing, by the server, an identifier of a customer object created at the first entity to a device associated with the second entity, where the second entity stores a set of access rules for accessing the customer object by the second entity, where the set of access rules is more restricted than a corresponding set of access rules associated with the customer object for the first entity. The access rules can be individualized on a per entity basis such that, for example, the second entity may be able to modify some of the fields of the shared customer object, but not others.

The process 500 may further include providing an identifier of a funding authorization associated with the customer object at the first entity to the second entity, where the second entity stores a second set of access rules in association with the identifier of the funding authorization. The funding authorization, for example, may correspond to a modality described above. Access rules associated with an identifier of the funding authorization or modality can be customized when the funding authorization or modality is shared with a customer object in relation to another entity.

The process 500 may further include, when a device associated with the second entity receives a customer update command at the second entity for the customer object, where the first entity has primary authority over the customer object, the primary authority restricting at least some update access to the customer object, receiving a request from the second entity to reassign the primary authority to the second entity; and when the primary authority is reassigned to the second entity, the update command is processed for the customer object. As discussed above, when an entity with a shared customer object is restricted from modifying the customer object, the entity can request from the entity having primary authority over the customer object to change the customer object, such as changing the data or changing the primary authority of the customer object. In such embodiments, if the primary authority is changed to the entity with the shared customer object, the entity who previously had the primary authority can be changed to having a shared customer object and the entity with the updated primary authority can process a change to the customer object that was previously restricted.

The process 500 may further include that a terminal processor in association with the organization data structure can process both a first event request associated with the first entity and a second event request associated with the second entity. For example, where terminal processors are typically associated with a particular entity, the terminal processor can be shared by the entity to another entity using the resource sharing techniques described herein such that a single terminal processor may be utilized by more than one entity.

Figure 9:
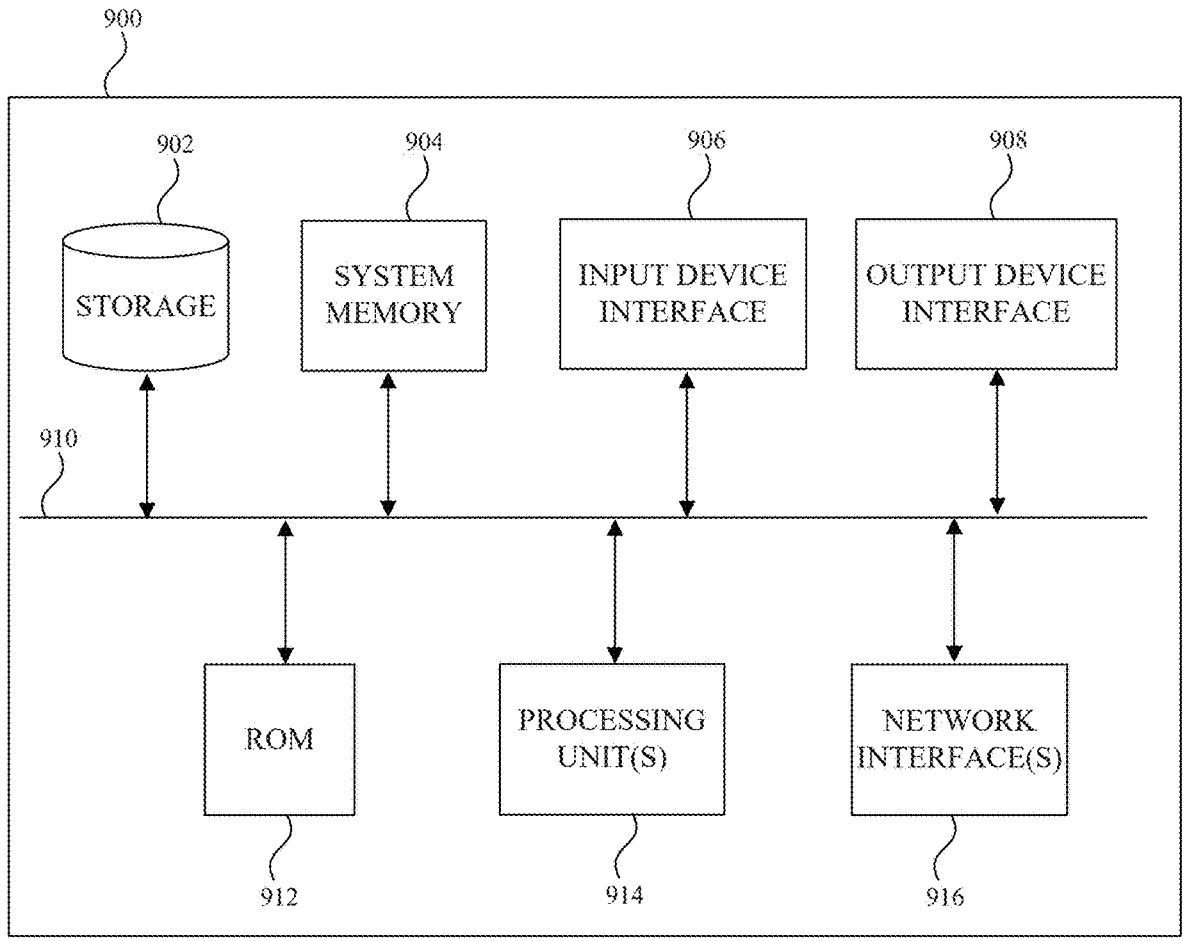
FIG. 9 depicts an example electronic system with which aspects of the present disclosure may be implemented, in accordance with one or more embodiments.

FIG. 9 depicts an example electronic system 900 with which aspects of the present disclosure may be implemented, in accordance with one or more embodiments. The electronic system 900 can be, and/or can be a part of, any electronic device for generating the features and processes described in reference to FIGS. 1-8, including but not limited to a laptop computer, tablet computer, smartphone, and wearable device (e.g., smartwatch, fitness band). The electronic system 900 may include various types of computer-readable media and interfaces for various other types of computer-readable media. The electronic system 900 includes one or more processing unit(s) 914, a persistent storage device 902, a system memory 904 (and/or buffer), an input device interface 906, an output device interface 908, a bus 910, a ROM 912, one or more processing unit(s) 914, one or more network interface(s) 916, and/or subsets and variations thereof.

The bus 910 collectively represents all system, peripheral, and chipset buses that communicatively connect the numerous internal devices of the electronic system 900. In one or more embodiments, the bus 910 communicatively connects the one or more processing unit(s) 914 with the ROM 912, the system memory 904, and the persistent storage device 902. From these various memory units, the one or more processing unit(s) 914 retrieves instructions to execute and data to process in order to execute the processes of the subject disclosure. The one or more processing unit(s) 914 can be a single processor or a multi-core processor in different embodiments.

The ROM 912 stores static data and instructions that are needed by the one or more processing unit(s) 914 and other modules of the electronic system 900. The persistent storage device 902, on the other hand, may be a read-and-write memory device. The persistent storage device 902 may be a non-volatile memory unit that stores instructions and data even when the electronic system 900 is off. In one or more embodiments, a mass-storage device (such as a magnetic or optical disk and its corresponding disk drive) may be used as the persistent storage device 902.

In one or more embodiments, a removable storage device (such as a floppy disk, flash drive, and its corresponding disk drive) may be used as the persistent storage device 902. Like the persistent storage device 902, the system memory 904 may be a read-and-write memory device. However, unlike the persistent storage device 902, the system memory 904 may be a volatile read-and-write memory, such as RAM. The system memory 904 may store any of the instructions and data that one or more processing unit(s) 914 may need at runtime. In one or more embodiments, the processes of the subject disclosure are stored in the system memory 904, the persistent storage device 902, and/or the ROM 912. From these various memory units, the one or more processing unit(s) 914 retrieves instructions to execute and data to process in order to execute the processes of one or more embodiments.

The bus 910 also connects to the input device interfaces 906 and output device interfaces 908. The input device interface 906 enables a user to communicate information and select commands to the electronic system 900. Input devices that may be used with the input device interface 906 may include, for example, alphanumeric keyboards, touch screens, and pointing devices. The output device interface 908 may enable the electronic system 900 to communicate information to users. For example, the output device interface 908 may provide the display of images generated by electronic system 900. Output devices that may be used with the output device interface 908 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more embodiments may include devices that function as both input and output devices, such as a touchscreen. In these embodiments, feedback provided to the user can be any form of sensory feedback, such as visual feedback, auditory feedback, or tactile feedback; and input from the user can be received in any form, including acoustic, speech, or tactile input.

The bus 910 also couples the electronic system 900 to one or more networks and/or to one or more network nodes through the one or more network interface(s) 916. In this manner, the electronic system 900 can be a part of a network of computers (such as a local area network, a wide area network, an intranet, or a network of networks, such as the internet). Any or all components of the electronic system 900 can be used in conjunction with the subject disclosure.

Embodiments within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more embodiments, the tangible computer-readable storage medium can be directly coupled to a computing device, while in other embodiments, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be re-arranged, or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together into a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A method comprising:
adjusting, by a server, access privileges of a customer object of a first entity to provide shared access to the customer object to a second entity that is associated with the first entity in an organizational data structure, wherein the first entity comprises an organization identifier corresponding to the organizational data structure, wherein the second entity comprises the organization identifier, wherein the customer object has associated therewith at least one account object, the at least one account object including one or more features associated therewith;
receiving, at the server, an operation request associated with the second entity with regard to the shared customer object;
providing, by the server, an option to associate the at least one account object to the shared customer object; and
after receiving an indication to associate the at least one account object to the shared customer object, executing, by the server, the operation request using the at least one account object.

2. The method of claim 1, further comprising:
associating a first modality of the at least one account object with the shared customer object of the second entity, while forgoing associating a second modality of the at least one account object with the shared customer object.

3. The method of claim 2, wherein the first modality corresponds to a first authorized mode of payment associated with the at least one account object, wherein the second modality corresponds to a second authorized mode of payment associated with the at least one account object.

4. The method of claim 1, wherein the first entity is designated as a primary entity for the customer object, wherein a designation of primary entity provides exclusive access rights to modify all aspects of corresponding customer objects.

5. The method of claim 4, further comprising:
receiving an update to the customer object, the update associated with the first entity; and
applying the update to the customer object based at least in part on the first entity being designated as the primary entity.

6. The method of claim 4, further comprising:
receiving an update to the customer object, the update associated with the second entity; and
forgoing applying the update to the customer object based at least in part on the first entity being designated as the primary entity.

7. The method of claim 6, further comprising:
requesting permission to modify the customer object from the first entity; and
upon receiving permission to modify the customer object, applying the update to the customer object.

8. The method of claim 4, further comprising:
receiving a request to designate the second entity as the primary entity for the customer object; and
designating the second entity as the primary entity for the customer object.

9. A server comprising:
a non-transitory computer readable medium storing instructions; and
one or more processors configured to execute the instructions to:

adjust, by the server, access privileges of a customer object of a first entity to provide shared access to the customer object to a second entity that is associated with the first entity in an organizational data structure, wherein the first entity comprises an organization identifier corresponding to the organizational data structure, wherein the second entity comprises the organization identifier, wherein the customer object has associated therewith at least one account object, the at least one account object including one or more features associated therewith;

receive, at the server, an operation request associated with the second entity with regard to the shared customer object;

provide, by the server, an option to associate the at least one account object to the shared customer object; and after receiving an indication to associate the at least one account object to the shared customer object, execute, by the server, the operation request using the at least one account object.

10. The server of claim 9, wherein the one or more processors are further configured to:

associate a first modality of the at least one account object with the shared customer object of the second entity, while forgoing associating a second modality of the at least one account object with the shared customer object.

11. The server of claim 9, wherein the one or more processors are further configured to:

receive an update to the customer object, the update associated with the first entity, and apply the update to the customer object based at least in part on the first entity being designated as a primary entity.

12. The server device of claim 9, wherein the one or more processors are further configured to:

receive an update to the customer object, the update associated with the second entity;

forgo applying the update to the customer object based at least in part on the first entity being designated as a primary entity;

request permission to modify the customer object from the first entity; and upon receiving permission to modify the customer object, apply the update to the customer object.

13. A non-transitory computer-readable medium storing a set of instructions which when executed cause one or more processors to:

adjust, by a server, access privileges of a customer object of a first entity to provide shared access to the customer object to a second entity that is associated with the first entity in an organizational data structure, wherein the first entity comprises an organization identifier corresponding to the organizational data structure, wherein the second entity comprises the organization identifier, wherein the customer object has associated therewith at least one account object, the at least one account object including one or more features associated therewith;

receive, at the server, an operation request associated with the second entity with regard to the shared customer object;

provide, by the server, an option to associate the at least one account object to the shared customer object; and after receiving an indication to associate the at least one account object to the shared customer object, execute, by the server, the operation request using the at least one account object.

14. The non-transitory computer-readable medium of claim 13, wherein the one or more instructions further cause the one or more processors to:

associate a first modality of the at least one account object with the shared customer object of the second entity, while forgoing associating a second modality of the at least one account object with the shared customer object.

15. The non-transitory computer-readable medium of claim 14, wherein the first modality corresponds to a first authorized mode of payment associated with the at least one account object, the second modality corresponds to a second authorized mode of payment associated with the at least one account object.

16. The non-transitory computer-readable medium of claim 13, wherein the first entity is designated as a primary entity for the customer object, a designation of primary entity provides exclusive access rights to modify all aspects of corresponding customer objects.

17. The non-transitory computer-readable medium of claim 16, wherein the one or more instructions further cause the one or more processors to:

receive an update to the customer object, the update associated with the first entity; and apply the update to the customer object based at least in part on the first entity being designated as the primary entity.

18. The non-transitory computer-readable medium of claim 16, wherein the one or more instructions further cause the one or more processors to:

receive an update to the customer object, the update associated with the second entity; and forgo applying the update to the customer object based at least in part on the first entity being designated as the primary entity.

19. The non-transitory computer-readable medium of claim 18, wherein the one or more instructions further cause the one or more processors to:

request permission to modify the customer object from the first entity; and upon receiving permission to modify the customer object, apply the update to the customer object.

20. The non-transitory computer-readable medium of claim 16, wherein the one or more instructions further cause the one or more processors to:

receive a request to designate the second entity as the primary entity for the customer object; and designate the second entity as the primary entity for the customer object.

* * * * *